Dec. 20, 1966     F. G. SHINSKEY     3,292,852
DEAD-TIME SIMULATOR FOR INDUSTRIAL
PROCESS CONTROL APPARATUS
Filed Jan. 25, 1962
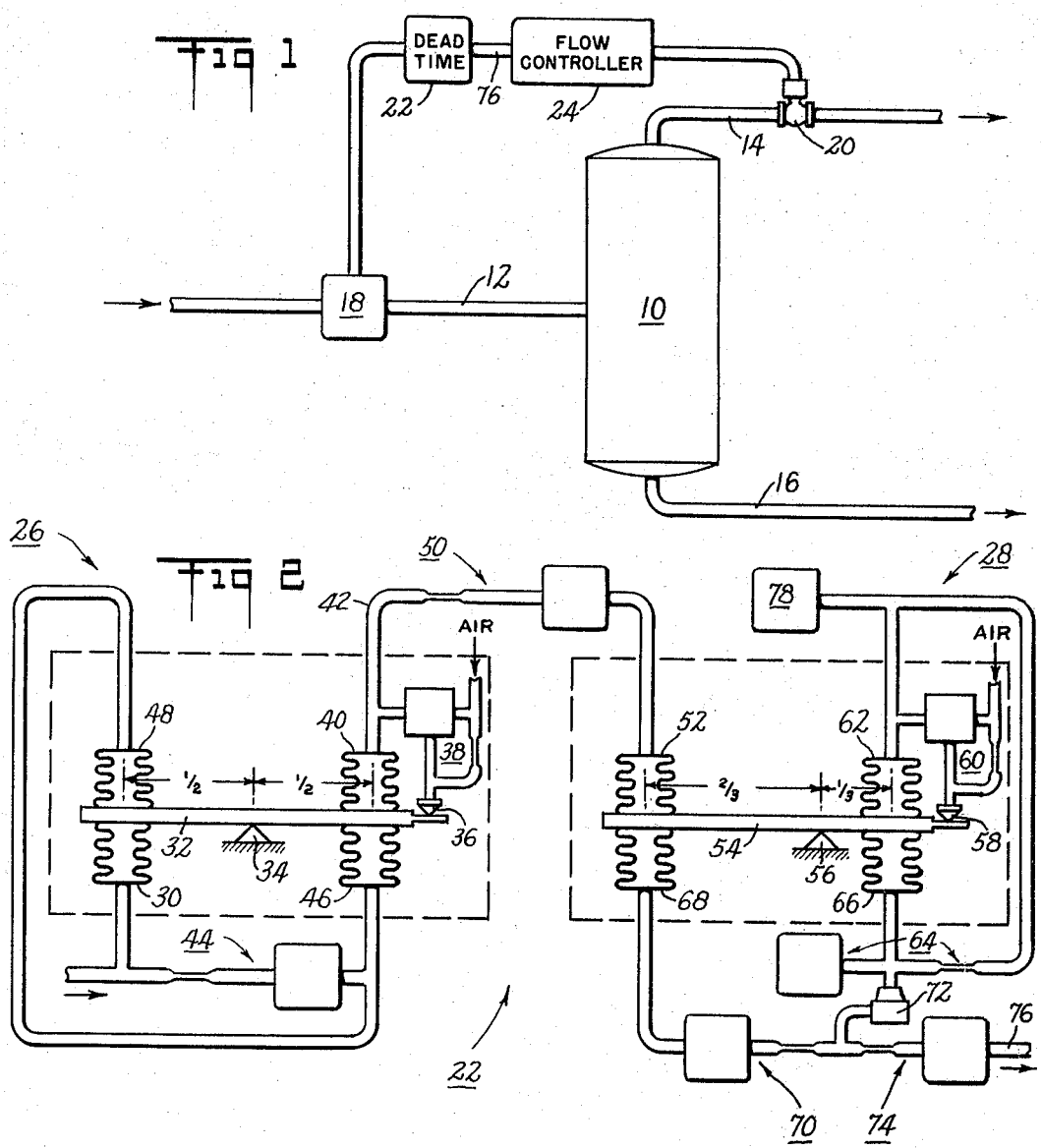
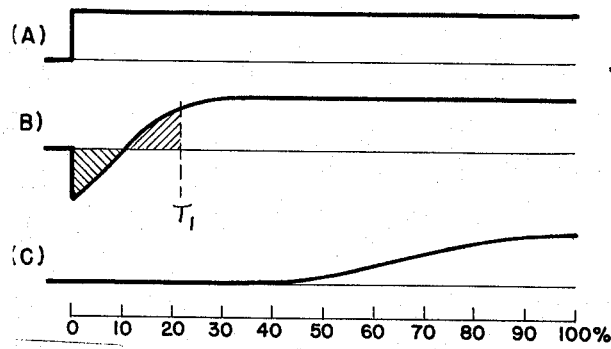
INVENTOR
*Francis G. Shinskey*
BY
*Curtis Morris + Safford*
ATTORNEYS

United States Patent Office 3,292,852
Patented Dec. 20, 1966

3,292,852
DEAD-TIME SIMULATOR FOR INDUSTRIAL
PROCESS CONTROL APPARATUS
Francis G. Shinskey, Foxboro, Mass., assignor to The
Foxboro Company, Foxboro, Mass.
Filed Jan. 25, 1962, Ser. No. 168,639
8 Claims. (Cl. 235—200)

This invention relates to process control apparatus. More in particular, this invention relates to apparatus for simulating the dead time of an industrial process, and which is adapted to be used with conventional control equipment for maintaining stable operation of the process.

Proper operation of complex industrial processes typically requires that one or more process conditions, such as flow rate or temperature, be controlled automatically in a predetermined manner. In many instances, the controlled process condition must be maintained constant, while in others the controlled process condition must also be adjusted automatically in correspondence to changes in a related process characteristic such as chemical composition and the like.

A number of processes have proven very difficult to control due to time delays inherent in their operation. All processes, of course, are characterized by time delays of some sort, and if the delay is a simple one (sometimes referred to as a "first-order" or "single-tank" delay), the control problem is usually relatively simple. However, the control problem can be severe when the process involves higher order delays, and especially when the delay is of the type called "dead time" or "transmission lag." These latter expressions refer to a process wherein there is appreciable time between a change in the process and the first significant sensing of the effect of that change on a measured process condition.

In some processes, the control problem can best be solved by incorporating in the control system a device which simulates the physical delay of the process. However, difficulty has been encountered in providing a satisfactory device capable of simulating dead times of long duration, as required for the control of certain processes. The particular problem has been to provide such a device which is inexpensive to construct, compact, and yet reliable in operation.

There are various ways known in the art to obtain time delays of long duration. For example, a plurality of non-interacting, single-order delay devices can be cascaded (i.e. connected in series relationship) to provide a total dead time proportional to the number of such devices used. However, for simulating long dead times this approach is unsatisfactory, primarily because of the high cost and complexity of the equipment.

In an embodiment of the invention to be described hereinbelow, there is provided a dead time simulator having two basic stages, both formed of conventional force-balance pneumatic elements. The first of these stages serves as a 180° phase-shifter, and the second serves as a slow-acting integrator. This apparatus provides a simulated dead time greater than 10 minutes, in response to a step input, and the dead time period represents 40% of the total elapsed time required for the output of the simulator to reach the new value. The performance of this apparatus is better than that obtained with 13 equal stages of cascaded, non-interacting, single-order lags.

Accordingly, it is an object of this invention to provide superior apparatus for simulating the time-delay action of a physical process. Another object of this invention is to provide improved apparatus for simulating dead time of relatively long duration. Still another object is to provide such apparatus that is economical in construction, and that is suited for use with conventional process control equipment. Other objects, aspects and advantages of the invention will be in part pointed out in, and in part apparent from, the following description considered together with the accompanying drawings, in which:

FIGURE 1 shows in block outline a process provided with apparatus in accordance with this invention;
FIGURE 2 shows the detailed construction of the dead-time simulator in diagrammatic form; and
FIGURES 3A, 3B and 3C are graphs showing various signals as a function of time.

Referring now to FIGURE 1, there is shown a typical process comprising a process vessel 10 having an input pipe 12 through which flows the feed stock. At the top of the process vessel 10 is an output pipe 14 for the top product, and at the bottom is an output pipe 16 for the bottom product.

Connected to the input pipe 12 is a flow measuring device 18 of any known type. In the upper output pipe 14 is a flow control valve 20 for setting the rate of flow of the top product from the process vessel. As is well known, when there is a change in the amount of feed stock flowing through the input pipe 12, it is necessary correspondingly to adjust the setting of the valve 20 in order to maintain proper operation of the process (sometimes referred to as "feed forward control").

However, the effect of a change in the amount of feed stock input does not reach the output pipe 14 for a substantial period of time, because the product must travel along an extended path in the process vessel. Consequently, to provide stable operation of the process, it is desirable to delay the adjustment of the control valve for a period of time corresponding to the time required for the product to travel from the flow measuring device 18 to the flow control valve 20.

For this purpose, the pneumatic signal produced by the flow measuring device 18 is directed to a dead time simulator 22, the output of which is delayed with respect to its input by an amount corresponding to the dead time delay of the process vessel 10. The output of simulator 22 is fed to a conventional flow controller 24 which operates in the usual way to adjust the control valve 20 to set the flow rate in correspondence with the amount of feed stock flowing through the input pipe 12.

Referring now to FIGURE 2, the dead time simulator 22 consists of two separate stages 26 and 28 comprising conventional force-balance pneumatic elements interconnected in an unique manner. All of the bellows shown are of equal size, so that they develop equal forces when pressurized to the same extent. The dead time apparatus is shown herein in diagrammatic form; the actual physical layout of the pneumatic elements may, however, be different, and preferably is similar to that shown in U.S. Patent 2,742,917, issued to H. L. Bowditch, on April 24, 1956.

In operation, if there is a sudden increase in the quantity of feed stock flowing through the input line 12, the flow measuring device 18 produces a corresponding step output signal (as indicated in FIGURE 3A) in the form of an increase in the pneumatic pressure applied to a bellows 30. This increase in pressure tends to rotate a balanceable member 32 clockwise about its pivot 34 and away from a pneumatic nozzle 36. This nozzle is connected through the usual restrictor and relay arrangement 38 to a supply of air under pressure, e.g. 20 p.s.i.

When the balanceable member 32 moves away from the mouth of the nozzle 36, the air flow through the nozzle increases and the pressure at the nozzle accordingly decreases due to the increased pressure drop across the restrictor in the supply line. Such a "flapper-nozzle" arrangement is, in effect, a pneumatic signal amplifier with very high sensitivity, e.g. the full range output of the nozzle can be obtained with a total movement of member 32 of less than .001". The decrease in nozzle pressure is transmitted by the relay 38 to a feedback bellows 40, the relay serving to provide a signal equal to the nozzle pressure but of substantial power capacity. The resulting reduction in torque applied by the bellows 40 to the member 32 tends to counterbalance the increased torque applied by bellows 30, with the result that member 32 remains virtually motionless.

The pressure in feedback bellows 40 constitutes the output signal of the first stage 26, and thus this bellows is connected directly to an output line 42. Accordingly, in the event of a sudden increase in the input pressure to the first stage, the initial effect at the output line 42 will be a corresponding decrease in pressure. This action is demonstrated by the graph of FIGURE 3B.

The input pressure applied to bellows 30 of the first stage 26 also is fed through a restrictor-capacity lag 44 (having a time-constant of one minute) to the two remaining bellows 46 and 48. At the instant the input pressure increases, there will be no change in pressure in these latter bellows due to the delaying action of the restrictor and capacity combination. Thereafter, however, the pressure in bellows 46 and 48 will gradually increase to apply a counterclockwise torque to the balanceable member 32, and tend to move this member closer to the mouth of the nozzle 36.

Accordingly, the restriction to flow of air from nozzle 36 is increased, so that the nozzle pressure correspondingly increases to the extent required to maintain a balance between the torque applied to member 32 by feedback bellows 40 and the combined torque developed by the other three bellows. This increase in pressure in bellows 40 is demonstrated in FIGURE 3B which shows that the output pressure crosses the zero axis after a moderately long period of time and ultimately reaches a new (positive) level greater than the output prior to the step upset. This end result will be understood from the fact that bellows 30, 46 and 48 ultimately are equally pressurized, and accordingly at that time will apply to the balanceable member 32 a net counterclockwise torque equal to the clockwise torque initially applied by the bellows 30.

Although the above explanation of the operation of the first stage 26 has been presented on a time basis, it also is pertinent to consider the operation of this stage on a frequency-response basis. In this regard, it should be noted that the first stage is, in effect, a phase shifter capable of providing a phase shift of 180°, the output amplitude being essentially constant for all frequencies of interest in practical industrial process control problems, i.e. up to at least 10 c.p.s. With the restrictor-capacity lag 44 arranged to provide a time constant of one minute, the first stage 26 will give a phase shift of 90° at a frequency of about .16 c.p.s., and a phase shift of essentially 180° at frequencies of 1.6 c.p.s. and higher.

The output line 42 of the first stage 26 directs the pneumatic pressure signal through a restrictor-capacity lag 50, having a time constant of 3 minutes, to a bellows 52 of the second stage 28. This bellows applies a counterclockwise torque to a balanceable member 54, pivoted at 56, which controls a nozzle 58 connected through the usual restrictor-relay arrangement 60 to a negative-feedback bellows 62. The output of the relay 60 also is fed through a restrictor-capacity lag 64 (having a time-constant of 5 minutes) to a positive-feedback bellows 66.

The combined action of the negative-feedback bellows 62 and the delayed-action positive-feedback bellows 66 provides an integrating effect, wherein the pressure in bellows 66 represents the time integral of the net torque applied to balanceable member 54 by bellows 52 and a second negative feedback bellows 68. This latter bellows is pressurized, through a resistor-capacity lag 70 (time-constant of 5 minutes), by a 1:1 booster 72 the input of which is derived from the integrator output, i.e. the bellows 66. Thus, the output of the integrator is fed back negatively to its input through a time-delay arrangement.

The final integrated output produced by the second stage 28 is fed from the booster 72 through a restrictor-capacity lag 74, having a time-constant of 1 minute, to the output line 76 leading to the flow controller 24. Lag 74, like lag 50, serves in part to provide a filtering action on the final output signal.

Reverting now to the time chart of FIGURE 3B, since the output of the first stage 26 first goes negative, and thereafter slowly shifts to a positive value, it will be evident that after some substantial delay time (designated $T_1$) the integral of the first stage output signal will be zero. Thus the output of the integrator of the second stage 28 will tend to simulate a dead-time characteristic during this period. Any tendency of the integrator output to depart from its initial value during this period is minimized by the lags 50 and 74 and the lagged negative feedback bellows 68, and these latter elements also serve to extend the length of the dead-time. A capacity 78 also is connected to bellows 62 to minimized undesirable oscillations.

The time-constants given herein for the various lags have been found to provide the desired long duration dead-time, and it should be understood that significant changes in the relationships between these time-constants can diminish the dead time achieved. Also, it will be noted that the integrator stage 28 is set at a 50% "proportioning band," i.e. the pivot 56 is located at two-thirds the distance along balanceable member 54. This has been found to be a desirable setting in relation to the other parameters of the simulator.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. A dead-time simulator for delaying a process control signal or the like, comprising, in combination, a signal-amplifying means having negative feedback means, first means for applying to the input of said amplifying means a first signal corresponding to said control signal, second means for applying to the input of said amplifying means a second signal corresponding to said control signal but in opposition to said first signal and having a magnitude greater than said first signal, said second means including means to delay said second signal to develop in the output of said amplifying means a phase shift greater than 90° with respect to said control signal; and integrator means connected to the output of said phase-shifting device to develop an output signal responsive to the integral of the output produced by said phase-shifting device.

2. A dead-time simulator comprising, in combination, a pneumatic phase-shifting device including a flexible pressure-responsive element adapted to receive an input signal, a balanceable member coupled to said flexible element to receive a first force therefrom proportional to the input signal, pneumatic negative feedback means operable by said balanceable member, signal-delaying means responsive to said input signal to apply to said balanceable member a delayed second force opposing said first force and operable with said feedback means to develop an output signal having a phase shift greater than 90° with respect to the input signal, and pneumatic integrating means connected to said phase-shifting device to develop a signal determined by the time integral of the output produced by said device.

3. A dead-time simulator comprising, in combination, a pneumatic phase-shifting device including a bellows responsive to an input signal, a balanceable member controlled by said bellows, pneumatic negative feedback means operable by said balanceable member, signal-delaying means responsive to said input signal for applying a delayed second force to said balanceable member in opposition to said first force and operable with said feedback means to develop an output signal having a phase shift of 180° with respect to the input signal; and pneumatic integrating means connected to said phase-shifting device to develop a signal determined by the time integral of the output produced by said phase-shifting device, said integrating means including a second balanceable member having means to apply thereto a force corresponding to the output of said phase-shifting device, and pneumatic feedback means controlled by said balanceable member including signal delaying means to develop an integrating effect.

4. Apparatus as in claim 3, wherein said integrating means includes second feedback means arranged to apply a negative feedback force to said second balanceable member in accordance with the output pressure developed by said integrating means, and second signal-delaying means forming part of said second feedback means.

5. Apparatus for simulating dead-time comprising first and second stage, said first stage including: a balanceable member, first pressure-responsive means for applying to said balanceable member a first force corresponding to the input signal, a pneumatic control nozzle operable by said balanceable member, second pressure responsive means for applying to said member a second force corresponding to the nozzle back pressure to maintain a balance of forces on said member, third pressure-responsive means for applying to said balanceable member a third force corresponding to the input signal but in opposition to said first force and having a magnitude greater than said first force, said third pressure-responsive means including pneumatic lag means for delaying the application of said third force; said second stage including: a second balanceable member, fourth pressure-responsive means for applying to said second balanceable member a fourth force corresponding to the pressure in said second pressure-responsive means, a second control nozzle operable by said second balanceable member, fifth pressure-responsive means coupled to said second control nozzle to apply a rebalance force to said second balanceable member, said fifth pressure-responsive means including means to develop a pressure signal proportional to the integral of the input force applied to said second balanceable member, sixth pressure-responsive means coupled through second pneumatic lag means to said fifth pressure-responsive means, said sixth pressure-responsive means being arranged to apply a negative feedback force to said second balanceable member, and output means for developing an output signal corresponding to the pressure of said fifth pressure-responsive means.

6. Apparatus for simulating dead-time comprising first and second stages, said first stage including: a balanceable member, first pressure-responsive means for applying to said balanceable member a first force corresponding to the input signal, a pneumatic control nozzle operable by said balanceable member, second pressure-responsive means for applying to said member a second force corresponding to the nozzle back pressure to maintain a balance of forces on said member, third pressure-responsive means for applying to said balanceable member a third force corresponding to the input signal but in opposition to said first force and having a magnitude greater than said first force, said third pressure-responsive means including first pneumatic lag means for delaying the application of said third force; second pneumatic lag means coupling said first stage to said second stage; said second stage including: a second balanceable member, fourth pressure-responsive means for applying to said second balanceable member a fourth force corresponding to the pressure in said second pressure-responsive means, a second control nozzle operable by said second balanceable member, fifth pressure-responsive means coupled to said second control nozzle to apply a rebalance force to said second balanceable member, said fifth pressure-responsive means including third pneumatic lag means to develop a pressure signal proportional to the integral of the input force applied to said second balanceable member, sixth pressure-responsive means, fourth pneumatic lag means coupling said sixth pressure-responsive means to said fifth pressure-responsive means, said sixth pressure-responsive means being arranged to apply a negative feedback force to said second balanceable member; and output means for developing an output signal corresponding to the pressure of said fifth pressure-responsive means, said output means including fifth pneumatic lag means.

7. Apparatus as in claim 6, wherein said first, second, third, fourth and fifth pneumatic lag means have time-constants with the relative proportions of 1:3:5:5:1, respectively.

8. A dead-time simulator comprising, in combination, first and second signal-responsive means connected in series such that the output of said first signal-responsive means is applied to an input to said second signal-responsive means; one of said signal-responsive means comprising phase-shifting means having means to develop an output signal (1) in phase with its input signal at zero frequency, (2) shifted in phase 90° with respect to its input signal at some intermediate frequency, and (3) shifted in phase an amount approaching 180° at high frequencies relative to said intermediate frequency, whereby said phase-shifting means produces, in response to a step input signal, an output which initially is inverted with respect to the sense of the input step but which gradually and over a relatively long period of time changes to a signal having the same sense as the original step input; the other of said signal-responsive means comprising integrating means arranged to develop an output signal corresponding to the time integral of the signal applied to the input thereof.

References Cited by the Examiner

UNITED STATES PATENTS

| | | | |
|---|---|---|---|
| 2,285,540 | 6/1942 | Stein et al. | 137—86 |
| 2,829,322 | 4/1958 | Silva | 318—28 |
| 2,923,307 | 2/1960 | Grogan | 137—86 |
| 3,020,490 | 2/1962 | Kleiss | 235—200 |
| 3,085,556 | 4/1963 | Peczkowski et al. | 137—85 |
| 3,088,664 | 5/1963 | Oglesby et al. | 235—200 |
| 3,104,810 | 9/1963 | Lupfer | 235—200 |
| 3,126,904 | 3/1964 | Ciarlariello | 137—85 |
| 3,175,764 | 3/1965 | Lupfer et al. | 235—200 |

FOREIGN PATENTS 860,485    2/1961    Great Britain.

RICHARD B. WILKINSON, *Primary Examiner.*

I. WEIL, LEO SMILOW, LOUIS J. CAPOZI,
*Examiners.*

A. ROSENTHAL, WAYNE F. BAUER,
*Assistant Examiners.*